May 24, 1960     A. B. ROOT     2,937,777
LIFT AND TILT CONTROL MECHANISM
Filed April 28, 1958     7 Sheets-Sheet 1
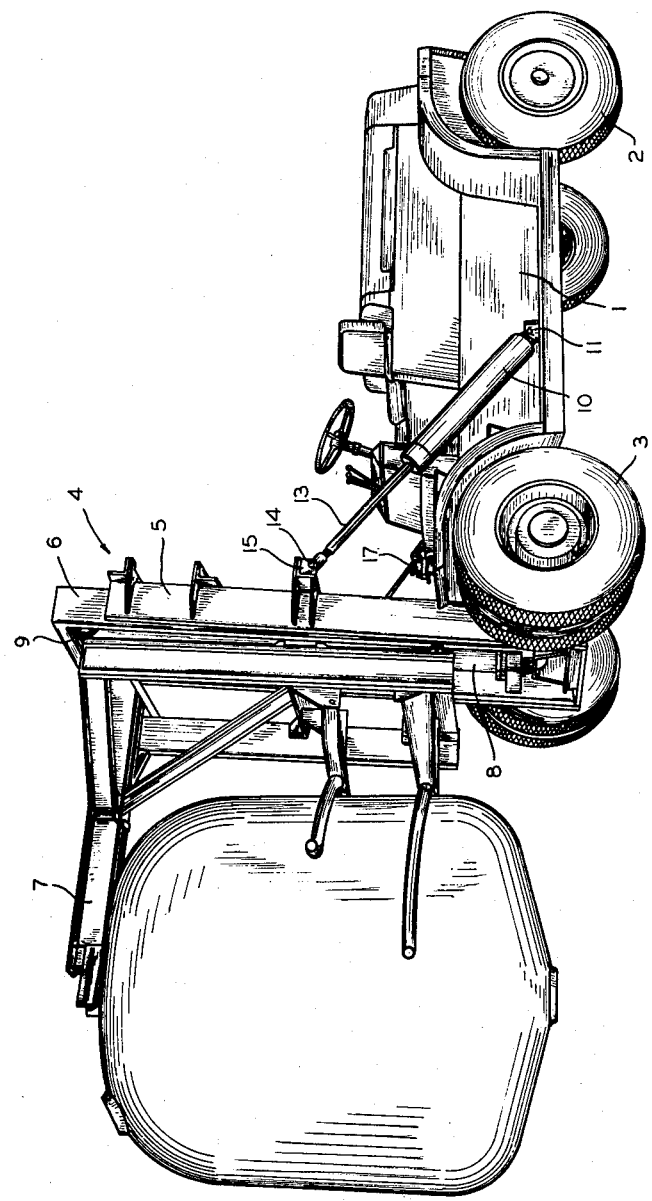
INVENTOR.
AFTON B. ROOT
BY
Brown, Jackson, Boettcher
+ Diener
ATTYS.

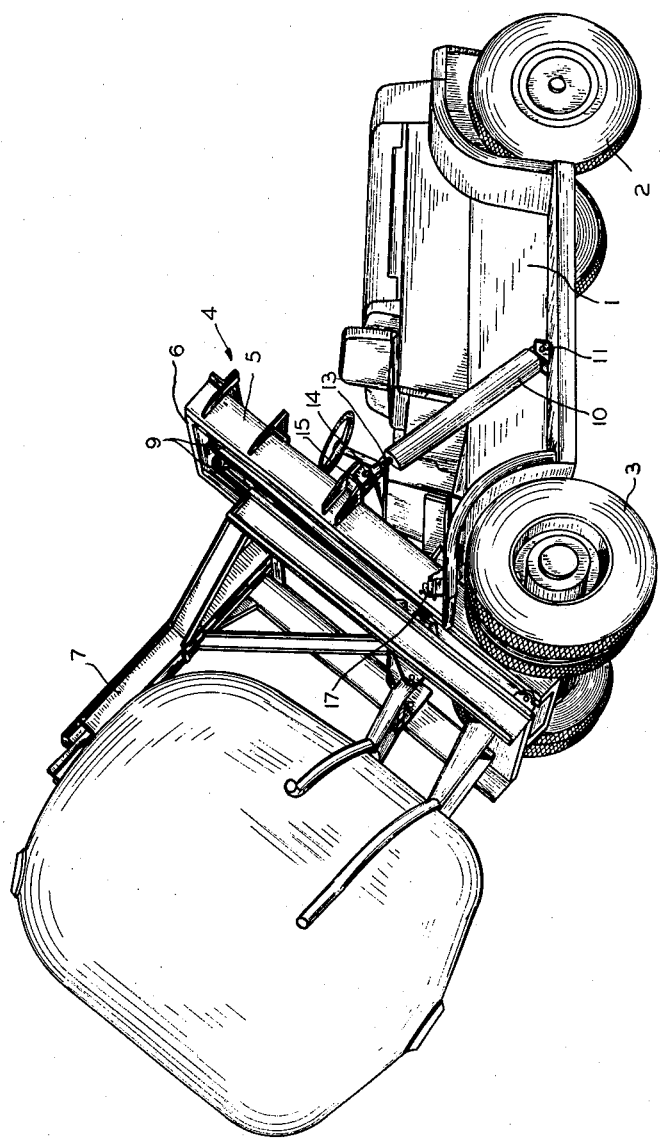

May 24, 1960 A. B. ROOT 2,937,777
LIFT AND TILT CONTROL MECHANISM
Filed April 28, 1958 7 Sheets-Sheet 3

INVENTOR.
AFTON B. ROOT
BY
Brown, Jackson, Boettcher
+ Dienner ATTYS.

May 24, 1960     A. B. ROOT     2,937,777
LIFT AND TILT CONTROL MECHANISM
Filed April 28, 1958     7 Sheets-Sheet 4

INVENTOR.
AFTON B. ROOT
BY Brown, Jackson, Boettcher + Dienner ATTYS.

May 24, 1960  A. B. ROOT  2,937,777
LIFT AND TILT CONTROL MECHANISM
Filed April 28, 1958  7 Sheets-Sheet 5

INVENTOR.
AFTON B. ROOT
BY Brown, Jackson, Boettcher + Dienner ATTYS.

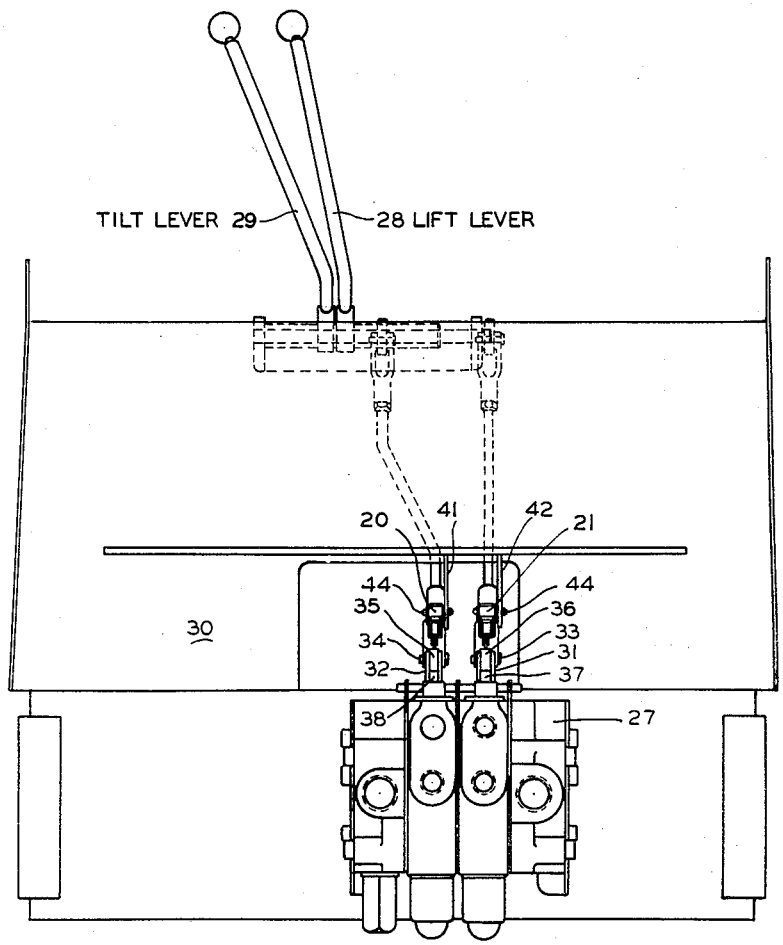

May 24, 1960  A. B. ROOT  2,937,777
LIFT AND TILT CONTROL MECHANISM
Filed April 28, 1958  7 Sheets-Sheet 7

INVENTOR.
AFTON B. ROOT
BY
Brown, Jackson, Boettcher
+ Dienner  ATTYS.

United States Patent Office 2,937,777
Patented May 24, 1960

2,937,777
LIFT AND TILT CONTROL MECHANISM

Afton B. Root, Battle Creek, Mich., assignor to Clark Equipment Company, a corporation of Michigan Filed Apr. 28, 1958, Ser. No. 731,285

11 Claims. (Cl. 214—673)

This invention relates to an industrial lift truck and more particularly to lift and tilt control mechanism for such trucks.

Industrial trucks of the type to which this invention pertains are fitted at the forward end with a mast structure for the load raising and carrying member, which mast structure is arranged to be tilted or swung into an inclined position with respect to the truck so that the weight of the load will be carried substantially uniformly by all of the truck supporting wheels, and for other reasons.

Broadly, the object of the present invention is to provide lift and tilt control mechanism to control not only the degree of upward movement of the mast and load carrying member, but also the degree of tilt thereof with respect to the truck.

The need for such controls arises out of the requirement of a lift truck with an extreme degree of backward tilt. For example, there is currently on the market, generally cylindrical large rubber-like containers for handling various chemicals, plastics, powdered and granulated material etc. Such containers have a centrally positioned lifting fitting on the upper end thereof, and a filler opening offset radially outwardly from said fitting and located on the side adjacent the upper end thereof. To completely fill such a container it is necessary to tilt the same to bring the filler opening to the top of the container. Previously, this necessitated special handling mechanism to tilt the container for filling, after which the truck was employed to engage the lifting fitting on the container for transport and storage of the latter.

Specifically, as one of its objects, the present invention contemplates the provision of an industrial lift truck having a mast structure tiltable to a degree that will permit the filling of the containers as aforesaid and for the transport and storage of the same, without the necessity of employing the special handling mechanism for tilting the container for filling purposes.

However, each lift truck normally has a safe limit recommended for backward tilt of the mast and in the development of a lift truck of the character described when it became necessary to exceed the recommended safe tilt limits to accomplish the intended purpose, it became necessary to develop some mechanism to limit the extent to which the mast and load carrying mechanism could be lifted in order to retain the vehicle's stability.

Accordingly, it is another object of the present invention to provide a truck of the character described with lift and tilt control mechanism of such a nature that when the tilt limit of the mast is reached the means for imparting lift and tilt to the mast are rendered inoperable to impart any further lift or tilt to such mast.

Still another object of the present invention resides in providing a lift truck of the character described with lift and tilt control mechanism for the mast that can be used in either electric, gasoline, diesel or L.P.G. powered vehicles with hydraulic systems to impart lift and tilt to the mast.

Heretofore, lift and tilt controls for the mast have been limited to use on a truck whose lift and tilt were powered electrically, since the main source of power was a large electric battery. Up to the present time, it has not been considered feasible to employ lift and tilt controls with vehicles that hydraulically imparted both lift and tilt to the mast, for when the lift and tilt controls of such a system became operative to prevent any further lift or tilt of the mast, the hydraulic system became locked-up, with no apparent means of unlocking it.

Accordingly, it is a further object of the present invention to provide an industrial truck whose motive power is derived from a hydraulic system with the provision of means for controlling lift and tilt of the mast structure thereof.

It is a still further object of the present invention to provide a lift truck having a hydraulic system for imparting both lift and tilt to the mast, with the provisions of means for unlocking said hydraulic system when it has become locked up by reason of operation of the lift and tilt control mechanism.

Briefly, the attainment of the above and other objects of the invention, are contemplated through the use of lift and tilt control mechanism comprising, essentially, a lift limit switch, which records the amount of lift of the mast; a tilt limit switch, which records the degree of tilt of the mast; a tilt solenoid valve, which controls fluid flow to the tilt cylinders; a lift solenoid valve, which controls hydraulic fluid flow to the lift cylinder; a tilt control switch and a lift control switch, which serve to unlock the hydraulic system, electrically, when both solenoid valves are sealed off.

A further feature of the invention resides in the particular manner in which the aforesaid component parts are wired together. It appears to be unique to arrange the lift and tilt limit switches in series with each other, and with said series relationship being associated in parallel with the lift and tilt solenoid valves, together with the solenoid deenergizing control switches, one in series with each solenoid, and with the source of electrical power through the ignition switch.

The tilt limit switch is wired normally open, while the lift limit switch is wired normally closed, but is manually opened when installed on the truck. The two solenoid valves are also wired normally open, and to limit action of any of the hydraulic cylinders it is necessary to close such valves and seal off the fluid flow to the cylinders. To do this, both the lift and tilt switches must be closed electrically to complete the circuit and allow power to reach and operate the solenoid valves, thus closing off the hydraulic fluid flow. The lift limit switch is geographically so positioned on the truck that upon upward movement of the mast structure the switch is automatically closed when the mast reaches the desired limit. The closing of this lift switch has no effect, at this time, upon the lift solenoid valve because of the series wiring of the lift and tilt limit switches. The tilt limit switch is also geographically positioned on the truck so as to be closed by contact of the mast therewith when the standard backward tilt angle (safe position) is exceeded. Thus, with the lift limit switch closed, the mast may be lifted or tilted, until such time as the mast closes the tilt limit switch, whereupon current will flow to operate and close both the lift and tilt solenoids. This closes off fluid flow to all the hydraulic cylinders, and the hydraulic system is in a lock-up condition. To unlock the system, the lift and tilt control switches, which are wired normally closed, are so positioned with respect to the main hydraulic valve control levers that by pushing the control levers in the direction of "lowering" the load, or "forward" tilt, such control switches will be opened thereby breaking the current flow to the solenoid valves, and thus permitting such valves to open for full fluid flow to the cylinders.

Other features and advantages will in part be obvious and in part will hereinafter appear and they consist generally in the features of construction, combination of elements and arrangements of parts, which will be exemplified in the construction to be described, and of which the scope of application will be indicated in the appended claims.

In the accompanying drawings in which is shown the preferred illustrative embodiment of the invention:

Figure 1 is a side elevational view of a lift truck embodying the principles of the present invention, showing the tilt limit switch located on the truck front fender and with the truck mast in a perpendicular position;

Figure 2 is a view similar to Figure 1, but showing the mast tilted backwardly and in engagement with the tilt limit switch;

Figure 7 is a front elevation view of the main hydraulic valve and valve controls and showing the location of the lift and tilt control switches;

Figure 11:
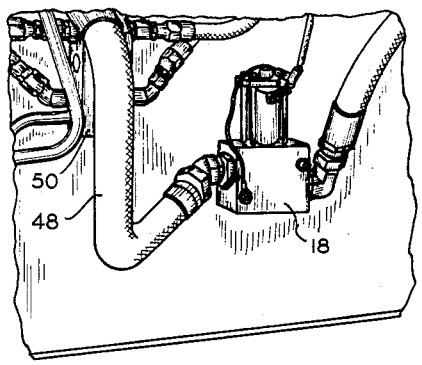
Figure 11 is a front elevational view of the lift solenoid valve showing its disposition in the engine compartment of the truck.

Referring now in detail to the drawings, 1 indicates generally the body of an industrial truck having the rear steering wheels 2 and front wheels 3 driven by suitable connections (not shown) from an internal combustion engine located within the body of the truck.

At the forward end of the truck is an extensible mast or boom mounted for pivotal movement about a horizontal axis, the mast comprising, essentially, a pair of outer laterally spaced apart channel members 5 forming guides for a pair of inner, upwardly extensible channel members 6. The latter, in turn, form guides for the upward movement thereon of a load carrying member 7. This latter member and the extensible uprights 6 are adapted to be raised or lowered by a lift cylinder 8 and chains 9 suitably connected thereto. The mast 4 may be tilted backwardly about its axis, whenever desired, by tilt cylinders 10 pivotally mounted on a bracket 11, welded or otherwise suitably secured to the truck body or frame 1. The free end of the piston rod 13 of the cylinder 10 is pivotally connected at 14 to a bracket 15, welded or otherwise secured to the outer channel member 5. There is a similar tilt cylinder on each side of the truck. Upon actuation of cylinders 10 the mast may be moved from a perpendicular position to a rearwardly inclined position, as shown, and vice versa.

The aforedescribed truck is of more or less conventional construction, although in the instant case the tilt cylinders have been relocated to provide for a greater degree of tilt of the mast than formerly. The purpose in describing it is to indicate the type of truck in connection with which the general features of the instant invention, now about to be described, are used.

As previously pointed out, the present invention relates to lift and tilt control mechanism for controlling the degree of lift and tilt of the mast, the need for such controls arising out of the requirement for a lift truck with an extreme degree of backward tilt. In the instant invention, the mast may be tilted rearwardly 40° about the usual trunnion connection thereof to the axle housing. The mechanism comprises, essentially, a lift limit switch 16; a tilt limit switch 17; a lift solenoid valve 18, which controls the flow of hydraulic fluid to the lift cylinder 8; a tilt solenoid valve 19, which controls the flow of hydraulic fluid to the tilt cylinders 10; a lift control switch 20, and a tilt control switch 21, which serve to unlock the hydraulic system, electrically, when both solenoid valves are closed and have the hydraulic system sealed-off. These components are all shown diagrammatically in Figure 4 of the drawings.

Figure 5:
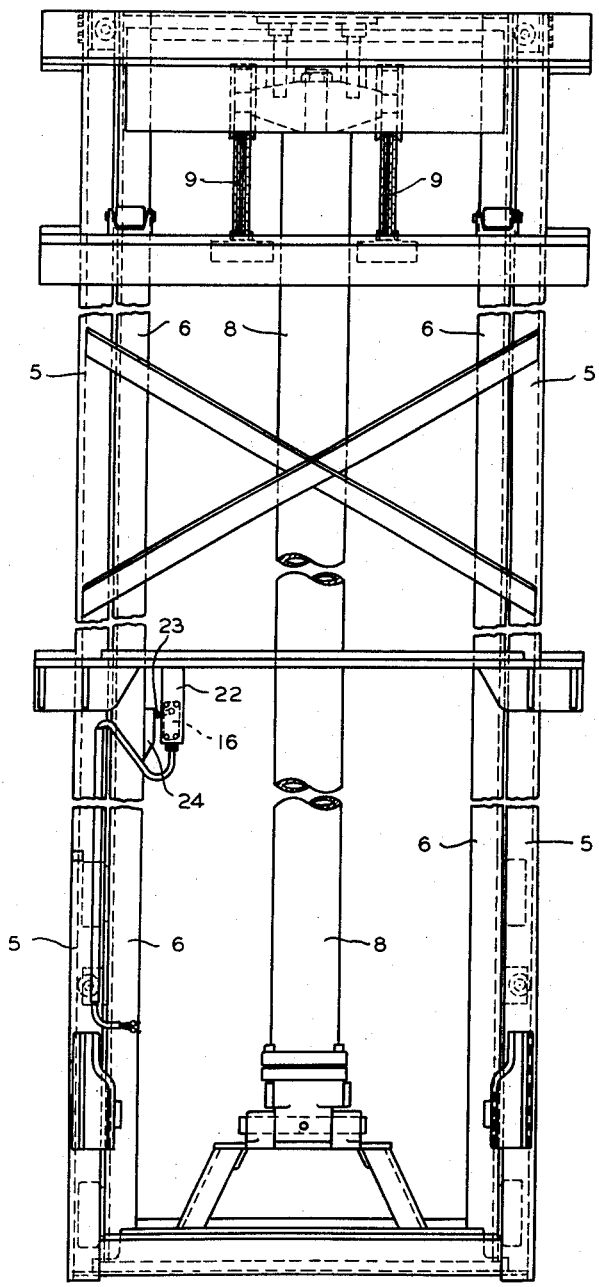
Figure 5 is a front view of the mast of the truck showing the location of the lift limit switch.
Figure 6:
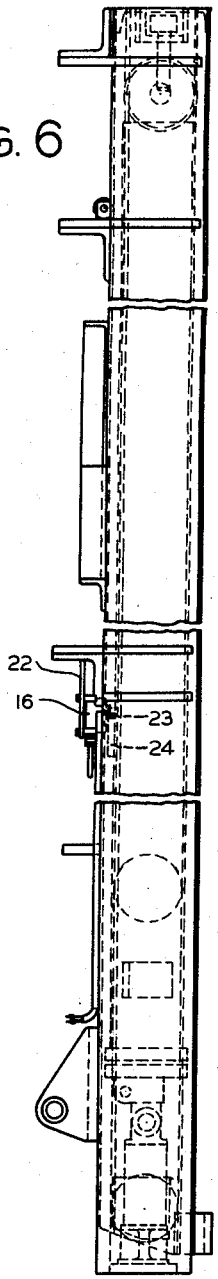
Figure 6 is a side view of Figure 5.

As shown in Figures 5 and 6 of the drawings, lift limit switch 16 is suitably mounted to a bracket 22, which bracket is welded, or otherwise suitably secured, to one of the outer channel members 5 of the mast. Such switch may be a simple "make and break switch" having a swingable control arm 23. In the retracted position of mast 4, the arm 23 normally rests on a block 24 rigidly secured to the inner channel member 6 adajcent bracket 22. This switch is wired normally closed and is manually opened when installed on the mast, i.e., in installing the switch on the mast, the placing of arm 23 on block 24 opens the switch. Since channel 5 is mounted to the truck drive axle, the switch 16 will remain stationary at all times. As the inner channel 6 is raised by lift cylinder 8, control arm 23 rides along block 24 until it drops thereoff, when the switch becomes closed, electrically. The amount of travel of the inner channel 6 that may be obtained before switch 16 is closed can be varied by changing the length of block 24, i.e., block 24 may be short for less travel or longer for more travel. Thus the length of block 24 determines the amount of movement of channel 6 that may be obtained before the electrical circuit through switch 16 is closed.

Figure 9:
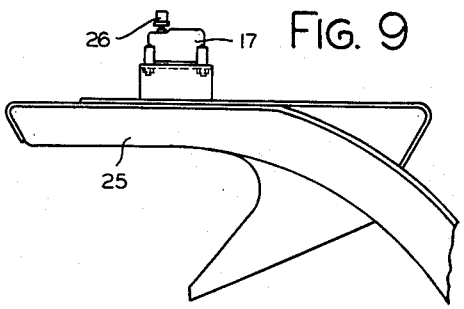
Figure 9 is a partial side elevational view of the left front fender of the industrial truck showing the tilt limit switch thereon.
Figure 10:
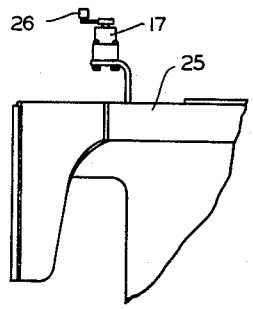
Figure 10 is a partial front elevational view of Figure 9.

As shown in Figures 9 and 10, the lift limit switch 17 is suitably mounted on one of the front fenders 25 of the truck, in this instance, the left front fender. Switch 17 is likewise a simple "make and break switch" having a control arm 26. This switch is wired normally open and is so positioned on fender 25 that the mast 4 will engage arm 26 when tilt exceeds safe position of mast 4. Swinging of arm 26 by mast 4 will close the switch, electrically.

Figure 12:
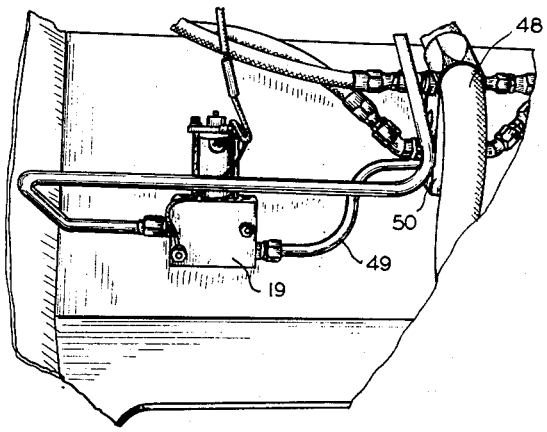
Figure 12 is a view similar to Figure 11 showing the tilt solenoid valve.
Figure 3:
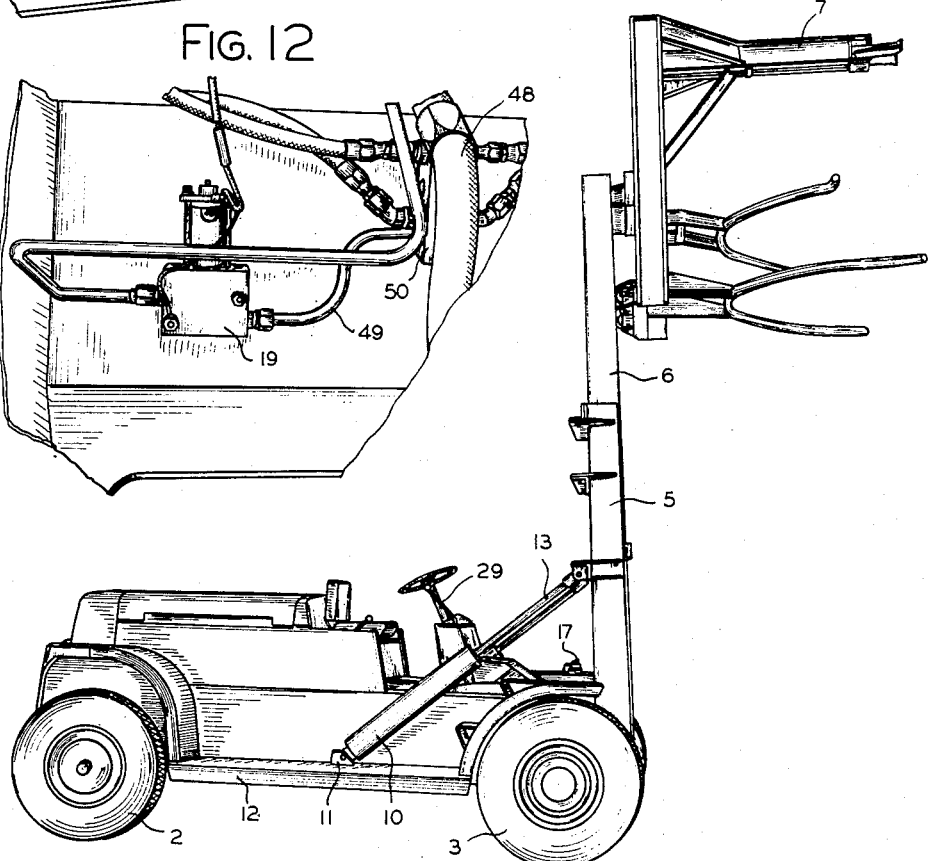
Figure 3 is a view similar to Figures 1 and 2, but showing the mast and load carrying member in raised position.

The lift and tilt solenoid valves 18 and 19 shown in Figures 11 and 12, respectively, may be of any standard construction, since they simply serve to control the supply of hydraulic fluid flow to the lift and tilt cylinders. Their purpose is, of course, to seal-off the hydraulic system to prevent the mast 4 from exceeding the safe limits of lift and tilt. Such valves may conveniently be mounted in the engine compartment of the truck, or at any other suitable or desired position thereon. Both solenoid valves are wired normally open and are closed, electrically, as hereinafter described.

Figure 8:
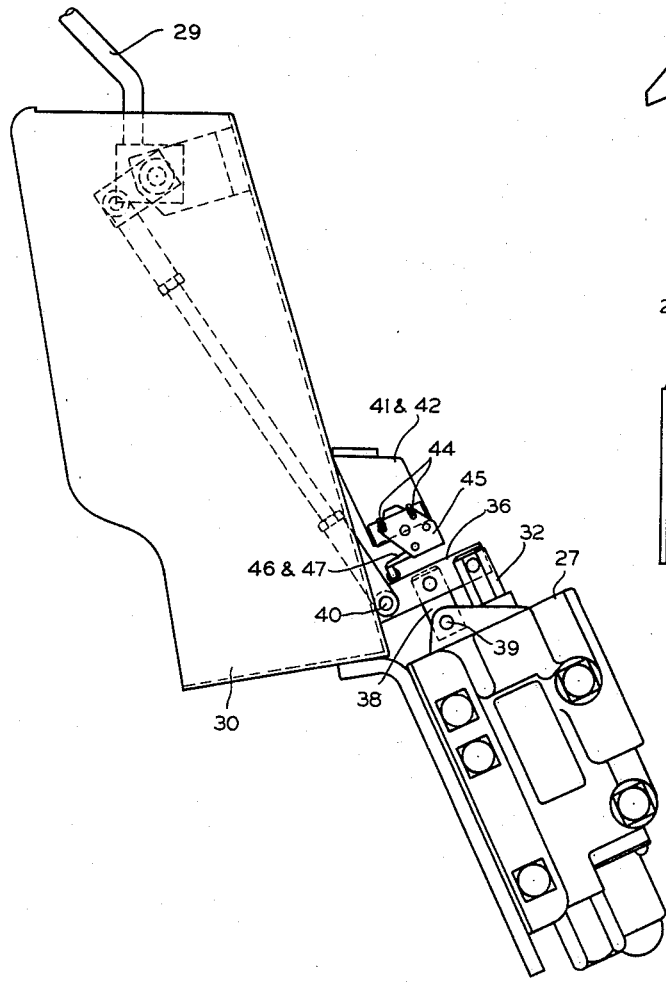
Figure 8 is a side elevational view of Figure 7.

In Figures 7 and 8 there is shown the main hydraulic valve 27, togther with the lift and tilt control levers 28 and 29, respectively. Valve 27 is a standard equipment hydraulic lift and tilt valve such as is normally employed on lift trucks and it, together with its control levers 28 and 29, is conveneintly mounted on the cowl 30 of the lift truck. It will be noted that the valve plungers 31 and 32 of valve 27 are connected at 33 and 34 to one end of arms 35 and 36. Such arms are pivoted intermediate their ends on vertical arms 37 and 38 secured at 39 to the housing of valve 27. The end of arms 35 and 36, opposite pivots 33 and 34 are pivoted at 40 to the linkage of control levers 28 and 29.

Brackets 41 and 42 are suitably secured to cowl 30 immediately above arms 35 and 36, respectively. Bracket 41 has the lift control switch 20 suitably secured thereto as by means of bolts 44, while bracket 42 has the tilt control switch 21 similarly secured thereto. Each of these switches may be of the simple "make and break" type having a control arm 46, 47, respectively, to ride on the arms 35, 36, respectively. These two switches are wired normally closed and are so adjusted that they will operate just before the cracking point of the spool in the valve is reached. When the hydraulic system is sealed-off by solenoid valves 18 and 19, by reason of operation of the lift and tilt limit switches 16 and 17, the pushing of levers 28 and 29 in the direction of "lowering" the load or "forward" tilt will serve to open switches 20 and 21 thus breaking current flow to solenoid valves 18 and 19, which valves thereupon open and thereby unlock the hydraulic system for full fluid flow to the cylinders.

Figure 4:
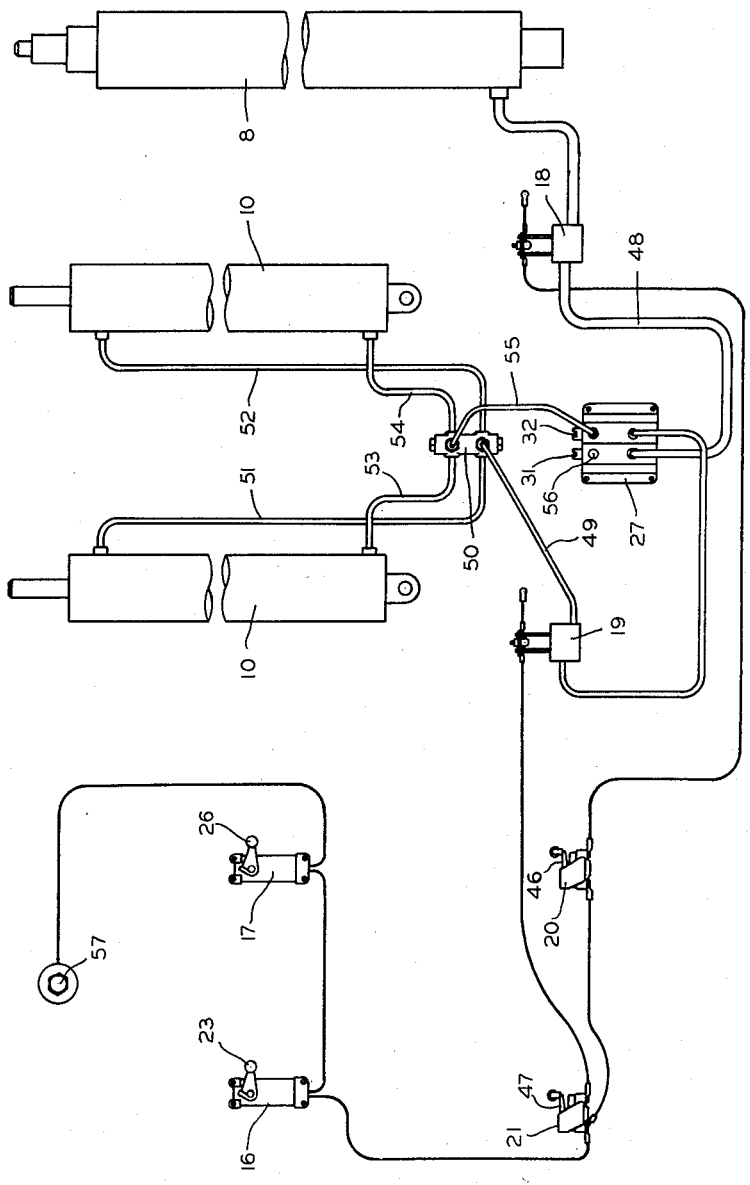
Figure 4 is a diagrammatic showing of the hydraulic system and the wiring of the various switches and solenoids of the present invention.

Referring now to Figure 4, it will be noted that the hydraulic system comprises a conduit 48 connecting the lower portion of the main hydraulic valve 27 with the lift cylinder 8, the lift solenoid valve 18 being interposed in this conduit between the main valve and the cylinder. A conduit 49 also connects the lower portion of the main valve 27 with the lower portion of a flow control valve 50, the tilt solenoid valve 19 being interposed in this conduit between the main valve and the flow control valve. Hoses 51 and 52 connect the lower portion of flow control valve 50 with the upper end of the two tilt cylinders 10, while hoses 53 and 54 connect the upper portion of the flow control valve 50 with the lower ends of the tilt cylinders 10. The upper portion of flow control valve 50 is connected by conduit 55 with the upper portion of main valve 27. Opening 56 in main valve 50 connects with a suitable supply of hydraulic fluid.

Still referring to Figure 4, it will be noted that the electrical system of the present invention derives its current supply from the ignition switch 57. As previously stated, the switch 17 and solenoid valves are wired normally open, while switches 16, 20 and 21 are wired normally closed, although, as stated, when switch 16 is installed on channel 5 it is held open by the control arm 23 thereof resting on block 24. Switches 16 and 17 are wired together in series circuit relation, and the circuit may be traced from ignition switch 57 through switch 17, thence through switch 16 to the tilt control switch 21. At such latter switch the circuit branches, one branch bypassing switch 20 and continuing to and through tilt solenoid valve 19 and thence to ground; while the other branch passes through switch 20, lift solenoid valve 18 and thence to ground.

It is believed obvious from the foregoing that when the control rod 28 is operated to admit hydraulic fluid to lift cylinder 8, the inner channels 6 will rise with respect to outer channels 5. In so doing channel 6 carries along block 24 upon which arm 23 of lift limit switch 16 rests. As soon as the block 24 becomes disengaged from arm 23, such arm will drop, thereby closing switch 16. Because of their series wired relationship the closing of switch 16 has no effect on continued lifting or tilting of the mast as the tilt limit switch is still open. However, when the tilt of the mast reaches the standard or safe tilt angle it will close tilt limit switch 17. As both switches 16 and 17 are now closed, current will flow to solenoid valves 18 and 19, which operate to close off the hydraulic system against further fluid flow. The hydraulic system is thus locked-up and further lift or tilt of the mast is prevented. To unlock the hydraulic system it is only necessary to move the control rods 28, 29 in the direction of "lowering" the load or "forward" tilt of the mast, the arms 35, 36 will act on control arms 46 and 47 of lift and tilt control switches 20, 21, to open such switches and thereby break the current flow to solenoid valves 18 and 19. Such valves thereupon open and the hydraulic system is returned to its normal unlocked condition.

While a preferred embodiment of the invention has been illustrated and described by way of example, it will be obvious that changes may be made therein within the spirit and scope of the invention. Therefore, the invention is not to be limited to the precise form herein disclosed except insofar as it may be so limited by the appended claims.

I claim:

1. In an industrial truck having an extensible mast mounted on the forward end thereof for tilting movement only between a vertical position and rearward position therefrom about a horizontal axis, hydraulic cylinders for extending and tilting said mast, a source of fluid power, and a hydraulic system for conveying the fluid power from said source to said cylinders, of means for limiting the lift and tilt of said mast comprising an electrical system including a source of electrical power and a pair of electrical switches, one of said switches being normally wired open and the other of said switches being normally wired closed but being manually opened when installed on said truck, means comprising a pair of solenoid valves in said hydraulic system electrically controlled by the closing of said switches to seal-off the hydraulic system against further fluid flow, and manually operable means in said electrical system operative only after said hydraulic system is completely sealed-off to arrest current flow to said solenoid valves and thereby to unlock said hydraulic system from its sealed-off condition.

2. In an industrial truck having an extensible mast mounted on the forward end thereof for tilting movement only between a vertical position and a rearward position therefrom about a horizontal axis, hydraulic cylinders for extending and tilting said mast, a source of fluid power, and a hydraulic system for conveying the fluid power from said source to said cylinders, of means for limiting the lift and tilt of said mast comprising an electrical system including a source of electrical power and a pair of electrical switches, one of said switches being normally wired open and the other of said switches being normally wired closed but being manually opened when installed on said truck, means comprising a pair of solenoid valves in said hydraulic system electrically controlled by the closing of said switches to seal-off the hydraulic system against further fluid flow, and a second pair of switches in said electrical system, both of said switches being normally wired closed and operative only after said hydraulic system has been completely sealed-off to arrest current flow to said solenoid valves and thereby to unlock said hydraulic system from its sealed-off condition.

3. In an industrial truck having an extensible mast mounted on the forward end thereof for tilting movement only between a vertical position and a rearward position therefrom about a horizontal axis, hydraulic cylinders for extending and tilting said mast, a source of fluid power, and a hydraulic system for conveying the fluid power from said source to said cylinders, of means for limiting the lift and tilt of said mast comprising an electrical power source and a pair of electrical switches wired together in series circuit relation, one of said switches being normally wired open and the other of said switches being normally wired closed but being manually opened when installed on said truck, means comprising a pair of solenoid valves in said hydraulic system electrically controlled by the closing of said switches to seal off the hydraulic system against further fluid flow, and a second pair of switches in said electrical system, both of said switches being normally wired closed and operative only after said hydraulic system has been completely sealed-off to arrest current flow to said solenoid valves and thereby to unlock said hydraulic system from its sealed-off condition, said solenoid valves and said second pair of switches being wired to said first named switches in parallel relationship.

4. In an industrial truck having an extensible mast mounted on the forward end thereof for tilting movement only between a vertical position and a rearward position therefrom about a horizontal axis, hydraulic cylinders for extending and tilting said mast, a source of fluid power, and a hydraulic system for conveying the fluid power from said source to said cylinders, of means for limiting the lift and tilt of said mast comprising an electrical system including a source of electrcial power and a lift limit switch carried by said mast and a tilt limit switch carried by the body of said truck, said tilt limit switch being normally wired opened and said lift limit switch being normally wired closed but being manually opened when installed on said truck, said switches being operable to closed position by the extension and tilting of said mast, means comprising a pair of solenoid valves in said hydraulic system electrically controlled by the closing of said lift and tilt limit switches to seal-off the hydraulic system against further fluid flow, and manually operable means in said electrical system adapted for operation only after said hydraulic system is completely sealed-off to arrest current flow to said solenoid valves and thereby to unlock said system from its sealed-off condition.

5. In an industrial truck having an extensible mast mounted on the forward end thereof for tilting movement only between a vertical position and a rearward position therefrom about a horizontal axis, hydraulic cylinders for extending and tilting said mast, a source of fluid power, and a hydraulic system for conveying the fluid power from said source to said cylinders, of means for limiting the lift and tilt of said mast comprising an electrical system including a source of electrical power and a lift limit switch carried by said mast and a tilt limit switch carried by the body of said truck, said tilt limit switch being normally wired open and said lift limit switch being normally wired closed but being manually opened when installed on said truck, said switches being operable to closed position by the extension and tilting of said mast, means comprising a pair of solenoid valves in said hydraulic system electrically controlled by the closing of said lift and tilt limit switches to seal-off the hydraulic system against further fluid flow, and a second pair of switches in said electrical system both normally wired closed and operable only after said hydraulic system is completely sealed-off to arrest current flow to said solenoid valves and thereby to unlock said hydraulic system from its sealed-off condition.

6. In an industrial truck having an extensible mast mounted on the forward end thereof for tilting movement only between a vertical position and rearward position therefrom about a horizontal axis, hydraulic cylinders for extending and tilting said mast, a source of fluid power, and a hydraulic system for conveying the fluid power from said source to said cylinders, of means for limiting the lift and tilt of said mast comprising an electrical system including a source of electrical power and a lift limit switch carried by said mast and a tilt limit switch carried by the body of said truck, said tilt limit switch being normally wired open and said lift limit switch being normally wired closed but being manually opened when installated on said truck, said switches being wired together in series circuit relation and being operable to closed position by the extension and tilting of said mast, means comprising a pair of solenoid valves in said hydraulic system electrically controlled by the closing of said lift and tilt limit switches to seal-off the hydraulic system against further fluid flow, and a second pair of switches in said electrical system both normally wired closed and operable only after said hydraulic system is completely sealed-off to arrest current flow to said solenoid valves and thereby to unlock said hydraulic system from its sealed-off condition, said solenoid valves and said second pair of switches being wired to said lift and tilt limit switches in parallel relation.

7. In an industrial truck having an extensible mast mounted on the forward end thereof for tilting movement only between a vertical position and rearward position therefrom about a horizontal axis, hydraulic cylinders for extending and tilting said mast, a source of fluid power, and a hydraulic system for conveying the fluid power from said source to said cylinders, including a main hydraulic valve and operating controls therefor, of means for limiting the lift and tilt of said mast comprising an electrical system including a source of electrical power and a pair of electrical switches, one of said switches normally being wired open and the other of said switches being normally wired closed but being opened when installed on said truck, means in said hydraulic system electrically controlled by the closing of said switches to seal-off the hydraulic system against further fluid flow, and means mounted adjacent said main hydraulic valve and operable by the controls therefor only after said hydraulic system is completely sealed-off to arrest current flow to said last named means and thereby to unlock said hydraulic system from its sealed-off condition.

8. In an industrial truck having an extensible mast mounted on the forward end thereof for tilting movement only between a vertical position and a rearward position therefrom about a horizontal axis, hydraulic cylinders for extending and tilting said mast, a source of fluid power, and a hydraulic system for conveying the fluid power from said source to said cylinders, including a main hydraulic valve and operating controls therefor, of means for limiting the lift and tilt of said mast comprising an electrical system including a source of electrical power and a lift limit switch and a tilt limit switch operable to closed position by the extension and tilting of said mast, said tilt limit switch being normally wired open and said lift limit switch being normally wired closed but being opened when installed on said truck, means comprising a pair of solenoid valves in said hydraulic system electrically controlled by the closing of said lift and tilt limit switches to seal-off the hydraulic system against further fluid flow, and a second pair of switches in said electrical system both normally wired closed mounted adjacent said main hydraulic valve and operable by the controls therefor only after said hydraulic system is completely sealed closed to arrest current flow to said solenoid valves and thereby to unlock said hydraulic system from its sealed-off condition.

9. In an industrial truck having an extensible mast mounted on the forward end thereof for tilting movement only between a vertical position and a rearward position therefrom about a horizontal axis, hydraulic cylinders for extending and tilting said mast, a source of fluid power, and a hydraulic system for conveying the fluid power from said source to said cylinders, including a main hydraulic valve and operating controls therefor, of means for limiting the lift and tilt of said mast comprising an electrical system including a source of electrical power and a lift limit switch carried by said mast and a tilt limit switch carried by the body of said truck, said tilt limit switch being normally wired open and said lift limit switch being normally wired closed but being opened when installed on said truck, said switches being operable to closed position by the extension and tilting of said mast, a pair of solenoid valves in said hydraulic system electrically controlled by the closing of said lift and tilt limit switches to seal-off the hydraulic system against further fluid flow, and a second pair of switches in said electrical system both normally wired closed mounted adjacent said main hydraulic valve and operable by the controls therefor only after said hydraulic system has been completely sealed-off to arrest current flow to said solenoid valves and thereby to unlock said hydraulic system from its sealed-off condition.

10. In an industrial truck having an extensible mast mounted on the forward end thereof for tilting movement only between a vertical position and a position rearward therefrom about a horizontal axis, a lift cylinder for extending said mast, and tilt cylinders for tilting said mast, a source of fluid power, and a hydraulic system for conveying said fluid power from said source to said lift and tilt cylinders, including a main hydraulic valve and operating controls therefor, of means for limiting the lift and tilt of the mast comprising an electrical system including a source of electrical power and a lift limit switch carried by said mast and a tilt limit switch carried by the body of said truck, said tilt limit switch being normally wired open and said lift limit switch being normally wired closed but being opened when installed on said truck, said switches being operable to closed position by the extension and tilting of said mast, a solenoid valve in said hydraulic system between said main hydraulic valve and said lift cylinder, and a solenoid valve in said hydraulic system between said main hydraulic valve and said tilt cylinders, said solenoid valves being operative upon closing of said lift and tilt limit switches to seal-off said hydraulic system against further fluid flow, and means mounted adjacent said main hydraulic valve and operable by the controls therefor only after said hydraulic system is completely sealed-off to interrupt the flow of current to said solenoids and thereby to unlock said hydraulic system from its sealed-off condition.

11. In an industrial truck having an extensible mast mounted on the forward end thereof for tilting movement only from a vertical position to a rearward position therefrom about a horizontal axis, a lift cylinder for extending said mast, and tilt cylinders for tilting said mast, a source of fluid power, and a hydraulic system for conveying said fluid power from said source to said lift and tilt cylinders, including a main hydraulic valve and operating controls therefor, of means for limiting the lift and tilt of the mast comprising an electrical system including a source of electrical power and a lift limit switch carried by said mast and a tilt limit switch carried by the body of said truck, said tilt limit switch being normally wired open and said lift limit switch being normally wired closed but being opened when installed on said truck, said switches being operable to closed position by the extension and tilting of said mast, a solenoid valve in said hydraulic system between said main hydraulic valve and said lift cylinder, and a solenoid valve in said hydraulic system between said main hydraulic valve and said tilt cylinders, said solenoid valves being operative upon closing of said lift and tilt limit switches to seal-off said hydraulic system against further fluid flow, a lift control switch interposed in said electrical system between the lift solenoid valve and the lift and tilt limit switches, and a tilt control switch interposed in said electrical system between said tilt solenoid valve and said lift and tilt switches, said lift and tilt control switches being normally wired closed and being positioned adjacent said main hydraulic valve for operation by the controls of the latter after the hydraulic system has been completely sealed-off to interrupt current flow to said solenoid valves and thus release said hydraulic system from its sealed-off condition.

References Cited in the file of this patent
UNITED STATES PATENTS

| | | |
|---|---|---|
| 2,414,192 | Dunham | Jan. 14, 1947 |
| 2,790,513 | Draxler | Apr. 30, 1957 |

FOREIGN PATENTS

| | | |
|---|---|---|
| 947,449 | Germany | Aug. 16, 1956 |